June 8, 1954  L. B. SMITH  2,680,835
COIL TURN TESTER

Filed April 6, 1951  2 Sheets-Sheet 1

Inventor
Lucian B. Smith
By Willits, Helmig & Baillio
Attorneys

June 8, 1954  L. B. SMITH  2,680,835
COIL TURN TESTER

Filed April 6, 1951  2 Sheets-Sheet 2

Inventor
Lucian B. Smith
By Willits, Helmig & Baillio
Attorneys

Patented June 8, 1954

2,680,835

UNITED STATES PATENT OFFICE 2,680,835

COIL TURN TESTER

Lucian B. Smith, Flint, Mich., assignor to General Motors Corporation, Detroit, Mich., a corporation of Delaware Application April 6, 1951, Serial No. 219,637

10 Claims. (Cl. 324—51)

This invention relates to testing means, and more specifically to means for testing to determine the exact number of turns in an existing electromagnetic or inductance coil. In precision electrical equipment it is necessary to utilize parts which have been fabricated to the exact specifications required. In the case of inductive coils for such equipment, and even those having a large number of turns, a few turns more or less than called for may make the apparatus absolutely unusable. At the present time most coils are wound on automatic machines, but it is essential that they be checked and tested before being assembled in the equipment of which they are to form a part. The smaller the number of turns that are specified to be in the coil, of course, the more nearly exact to the turn they must be.

It is therefore an object of my invention to provide means for quickly and easily testing coils to determine the exact number of turns therein.

It is a further object of my invention to provide coil testing means in which the coil to be tested may be easily applied to the test equipment, and the number of turns read quickly.

It is a still further object of my invention to provide coil testing means which can be easily adjusted to test coils having different numbers of turns.

It is a still further object of my invention to provide coil testing equipment which is rugged but very accurate.

With these and other objects in view which will be apparent as the specification proceeds, my invention will be best understood by reference to the following specification and claims and the illustrations in the accompanying drawings in which:

The basic underlying principle of my construction is to provide a closed magnetic circuit with exciting means for introducing a specific amount of flux therein, and to mount on that magnetic circuit at a particular point a master or standard coil, the number of turns therein being known, and adjacent the same the coil to be tested with an unknown number of turns. These two coils are so located on the magnetic circuit that if they do contain the same number of turns they will, when connected in bucking relation, indicate on a meter a minimum of voltage. The master or standard coil is provided with extra turns tapped at each turn, and the first few turns on the upper end are also tapped, so that tolerances above and below the exact number may be indicated. For example, if the coil being tested should have 1700 turns, then the master coil with which the production coils are to be checked is provided with 1704 turns, and a tap is made from each of these turns down to 1695, so that by adjustment the operator can tell how many over or under the exact 1700 the production coil has if the error is not greater than five turns. In general then, a closed magnetic circuit is provided with exciting means at one portion and a removable section upon which a coil to be tested may be easily applied and removed so that a minimum of time may be taken in checking these coils.

Figure 1:
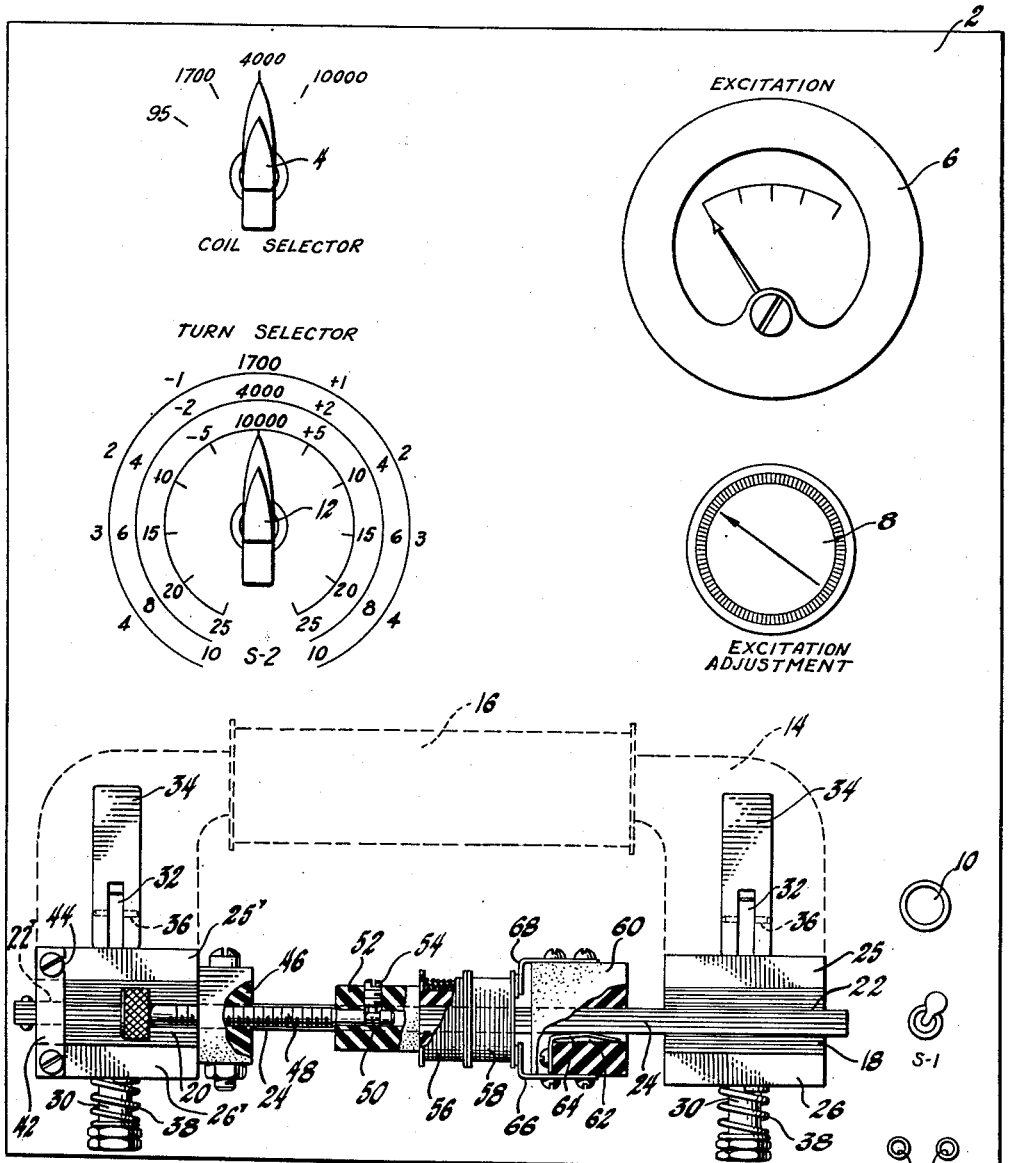
Figure 1 is a front elevation of testing apparatus embodying my invention.

Referring now more specifically to the construction shown in Figure 1, there is illustrated a front panel 2 of a device for testing, as exemplary, four different coils; namely, those having 95 turns, 1700 turns, 4000 turns, and 10,000 turns. Of course, these are only exemplary, and any particular numbers could be applied as desired. In the upper left hand corner is a switching means or coil selector 4 mounted on the panel 2 for rotation, which switching means 4 is turned to adjust the apparatus in general for the number of turn coil which it is desired to test. Mounted on the panel 2 to the right of the coil turn selector 4 is a meter 6 indicating the excitation of the system, and below the meter 6 is an excitation adjustment means 8 to vary the excitation as desired. The power supply to the system is provided through a plug 10 and in this instance there is utilized 115 volt, 400 cycle current. Below the selector 4, which identifies the coil number of turns in general, there is a second adjustable switching means operated by knob 12 having a series of different scales adjacent thereto. This switch is turned to connect into the circuit the taps of the master coil as indicated in the previous discussion, and is indexed in the number of turns plus or minus from that originally intended on said coil. This switch is identified in Figure 3 as S2. Behind said panel and shown in dotted lines there is provided a main magnetic circuit 14, having thereon an exciting coil 16. The magnetic yoke 14 extends through the panel at two spaced points to provide horizontal extensions 18 and 20.

Figure 2:
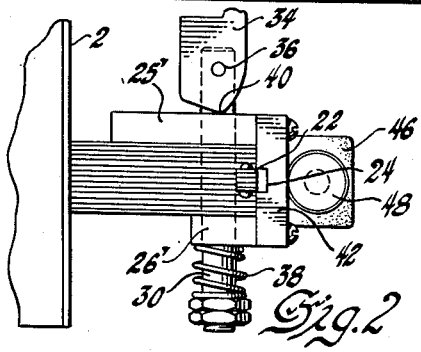
Figure 2 is an end view of a portion of the magnetic circuit showing the clamping means.

As shown in Figure 2, these extend some distance beyond the panel 2 and each is provided at its outer end with a notch 22 in which a horizontal crossbar 24, also of laminated material and acting as a core, may be placed. The projecting laminated core arm 18 is provided with upper and lower plates 25 and 26, so that pressure may be brought on the assembly in a vertical direction to clamp the end of the horizontal bar 24 in place. This vertical pressure is provided by a pin 30 which projects through both plates 25 and 26 and also through the laminated arm 18, said pin 30 having a reduced upper section 32 upon which is pivotally mounted a locking lever 34 by pin 36. The lower end of the pin 36 is provided with a coil spring 38, which tends to force it in a downward direction, and therefore pull the lower edge of the locking lever 34 against the top compression plate 25. The lower surface of the locking lever 34 is cam shaped as shown at 40, so that as the locking lever is rotated about the pin 36, the spring 38 will be compressed to apply vertical pressure on the plates and on the end of the laminations, and thus squeeze the end of the laminated bar 24 in place. By flipping the lever down into a horizontal position, the spring pressure due to spring 38 will be reduced and the end of the laminated crossbar 24 may be easily removed from the slot 22 in the forward base of the laminated core member 18. Exactly the same type of mounting is provided in the forward face of the laminated core member 20, since a slot 22' is also provided in the forward face of this projecting member and a vertical pin and locking lever assembly is likewise provided on this side to produce vertical pressure on the left hand end of the laminated bar 24 to maintain it in proper position. Like reference characters, primed, therefore identify like parts on the left hand side of the assembly as shown in Figure 1.

In the case of the vertical pressure plates 25' and 26', used in the left hand assembly, however, these are secured together through a link 42, which is fastened to the lower pressure plate 26' by a suitable cap screw and also to the upper plate 25' in a similar manner except that a slot 44 is provided in the link 42 so that when the screw is released to a slight degree the link may be slid out from under the same to permit it to be moved out of the way. The reason for the connection of the two pressure plates 25' and 26' together is that when the bar 24 is moved outwardly to allow the coil which has been tested to be removed and to replace it with a new one to be tested, the left hand end is retained so that the whole assembly does not come out of the machine and it is only for major purposes of adjustment that the whole coil mounting assembly need be taken out.

Fixedly mounted on the crossbar 24 is a supporting bracket 46, the purpose of which is to support an adjusting screw 48 in threaded relation through an opening therein in parallel spaced relation to bar 24, said adjusting screw being provided with a reduced end grooved at 50, which projects into an adjusting block 52 mounted in sliding relation on the bar 24, and having therein a setscrew 54, whose point enters into the groove 50, thus permitting the adjusting screw 48 to rotate therein, but also causing the block to move longitudinally as the adjusting screw 48 is turned. Thus, upon the operator turning the knurled head of the adjusting screw 48 the block 52 will move back and forth on the bar 24 for adjustment. A standard coil such as coil 56 is also mounted on the bar 24 in a position adjacent the block 52, and adapted to be brought up into firm engagement therewith. Adjacent the standard coil 56 is a coil to be tested, such as 58, which lies next in sequence on the right hand side of the coil 56. Adjustable contact block 60 mounted on the crossbar 24 completes the assembly. This block 60 is made of insulating material and has a central opening 62 whose dimensions are larger than those of the cross-section of the bar 24, and there is inserted in this opening a spring member 64 adapted to ride against the undersurface of the bar 24 and permit longitudinal movement, but in the main to frictionally lock the assembly against movement. This block 60 also carries spaced electrical conductive contacts such as 66 and 68, which are connected into the test circuit to be described, and also engage contact plates on the surface of the coil being tested to connect it into the circuit. In the lower right hand portion of Figure 1 there is shown a main control switch S-1 and below that a pair of jacks 70 to which a meter such as a vacuum tube voltmeter for indicating balance may be connected.

Figure 3:
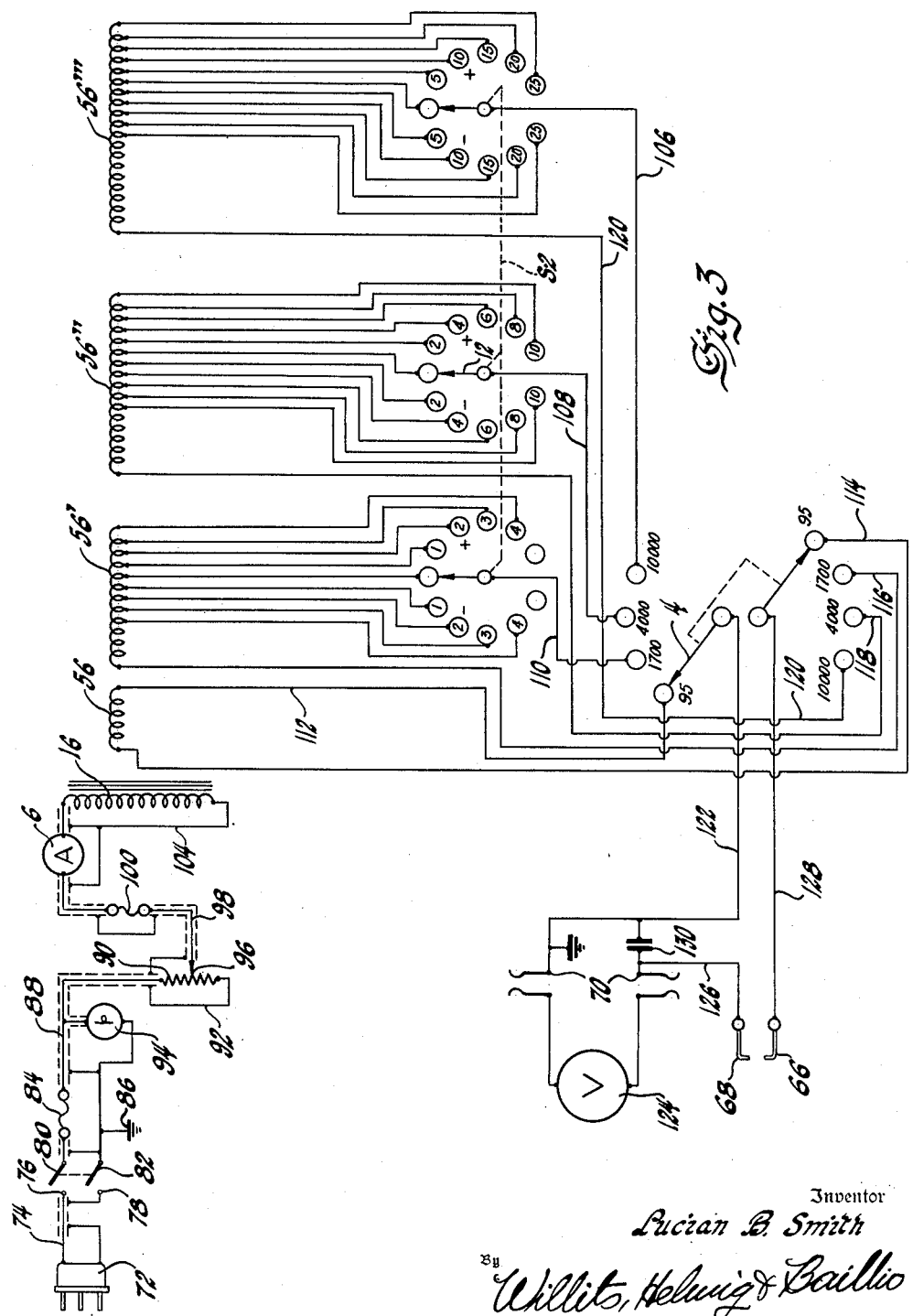
Figure 3 is an electrical circuit diagram for the system.

Referring now more particularly to Figure 3, which is the electrical circuit diagram of my device, there is shown therein a plug 72 to which the source of power such as, for example, 115 volts, 400 cycle, may be connected. This plug is connected through line 74 with one contact 76 of a double pole switch, the other pole 78 of the switch being connected in like manner to the plug 72. The two movable members 80 and 82 of the switch are connected respectively to a fuse 84 and a ground connection 86. Fuse 84 is connected through line 88 with one terminal of a potentiometer 90, the other terminal of which is connected back through line 92 with the shield or ground potential of the system. Connected between line 88 and ground 86 is an indicating lamp 94 to show when the system is energized. The adjustable tap on potentiometer 90 indicated at 96 is connected through line 98 with a fuse 100 and thence through an ammeter 6 to one terminal of the exciting coil 16. The opposite end of the exciting coil 16 is connected through line 104 back to the shield or ground. The system so far identified therefore provides an adjustable amount of power to the exciting coil to provide flux for the testing.

As previously mentioned, a standard coil is mounted on the crossbar 24, having the required number of turns. In Figure 3 several different standard coils are shown and these may be indicated at 56, 56', 56'' and 56'''. Only one coil is actually applied to the test equipment at a time. Each of these coils as it is mounted for use is, however, provided with connections back from the various taps to the switch identified in the first instance as S-2 and which, as shown in Figure 1, is provided with three different scales. The reason that only three different scales are provided is that in the case of the coil having the lowest number of turns, and in this case it was assumed that 95 turns were used, no tolerance is permitted, and the standard coil and the coil to be tested must have exactly the same number of turns. For the coil having the larger number of turns, for example 1700, taps are provided on each turn plus and minus 1700 for four turns, and these are indicated on Figure 3. When the coil has a larger number of turns, such for example as 4000, it is not necessary to tap each turn, but in that instance every other turn is tapped plus or minus four or five above and below the proper number. On the other hand, in a coil having 10,000 turns, even a larger number of turns may be grouped together, and in that case every fifth turn is shown as tapped and brought out to the contact on the switch S-2. Thus, by properly plugging in the correct coil in means having connections to the switch S-2, then movement of the arm 12 over the range will provide contacts to the proper taps in the coil being used. The movable arms 12 of the switch S-2 are separately connected to the tape on the coil selector switch 4, and this is shown in Figure 3 through conductive lines 106, 108, and 110 to the proper contacts on the switch 4 labeled 10,000, 4000, and 1700, respectively. One terminal of test coil 56 is directly connected through line 112 to the terminal marked 95 on the same switch. A duplicate set of contacts which are engaged as the arm 4 is turned in each instance are connected through lines 114, 116, 118 and 120 with the opposite terminals of the coils 56, 56', 56'' and 56''' respectively. While switch 4 is shown in Figure 3 as being two different arms, they are indicated as moving together. The upper arm is connected through line 122 with one of the jacks 70 for the vacuum tube voltmeter 124, and the other jack 70 is connected through line 126 with one of the contacts 68 on the insulating block 60, which slides on the bar 24. The opposite contact 66 also located on the block 60 is connected through line 128 back to the other arm of switch 4. A condenser 130 is connected across the phone jacks.

In the operation of the device, the main switch 80—82, which corresponds to switch S–1 on the front of the panel, is closed to apply power to the excitation coil 16, assuming, of course, that the plug 72 is connected. The amount of excitation is adjusted by the operator by movement of the excitation adjustment 8 which moves the potentiometer point 96 over the potentiometer 90, and the amount of excitation is read directly in milliamperes on the meter 6. When this has been set to the proper desired value, the bar 24, which has been released from the clamped position in the ends of the laminated core members 18 and 20, has placed thereon the standard coil (56, 56', 56'', 56''') which fits the particular situation at hand. Assuming for the moment that it is desired to test coils having 95 turns, standard coil 56 will be slipped onto the bar 24 until it engages the surface of adjustable block 52. The leads from coil 56 will be plugged into the proper receptacle on the device to cause these leads to be connected to the two taps labeled 95 on Figure 3 for switch 4.

A coil having the known correct number of turns, such as coil 58, is next slid onto bar 24 until it engages the surface of the standard coil 56, and lastly the block 60 is slid onto the bar 24 until its two contacting members 66 and 68 engage the conductive blocks in the end of the second or calibrating coil. The right hand end of bar 24 is now slid into place in the slot in the end of the laminations 18 and the left hand end is snugly forced back into its slot, and the clamping levers 34 forced down to hold it in place.

Assuming that the voltmeter 124 has been plugged into the jacks 70, the adjusting screw 48 is now turned to move the whole assembly back and forth until a minimum reading on the voltmeter is obtained. This indicates that both coils 56 and 58 are in similar portions of the magnetic field, the switch 4, of course, having been previously moved until it indicated the 95-turn position. At this time the switch S–2 for arm 12 is of no utility, as it is not introduced into the circuit for any adjustment. Coil 58 is then removed and coils to be tested may be sequentially applied. If the vacuum tube voltmeter reads a sufficiently null or minor value, then the coil being tested is within the range. If the meter cannot be balanced to such a position, then the new coil has one or more turns away from the normal, which in the 95-turn case makes it unsatisfactory. After the apparatus has once been balanced, then it is only necessary for the operator to unlatch the right hand locking lever 34 and pivot the bar 24 about its left hand end to remove the block 60 with its contacts and the coil being tested, replace the latter with the new coil to be tested, and the contact block, and relock in position. If the voltmeter reading is satisfactory the coil is good. This, of course, is repeated as long as coils having the same number of turns are being tested.

When, however, it is desired to adjust the apparatus so that coils having a different number of turns can be tested if desired, then the standard coil 56 is also removed, and it is replaced by a standard coil such as 56' or 56'', as the case may be, to take care of the situation. Let it be assumed that in this instance it is now desired to test coils having 4000 turns, and, therefore, a standard coil such as 56'' will now be slid onto the bar 24 and assume the position formerly occupied by coil 56. The tapped connections as shown in Figure 3, are now, through suitable plug means, not shown, connected to the switch points engaged by movement of the arm 12 of switch S–2. As before, a coil having the known correct number of turns is next assembled on the bar 24 and lastly, as in the previous instance, the insulating sliding block 60, with its engaging contacts 66—68. With the switch arm 12 in any position, preferably neutral, the adjustable screw 48 is again rotated until a null or minimum reading in the voltmeter is obtained, and any movement in either direction of the coil assembly from that spot will cause an increase in the reading on the meter. This indicates, as before, that both coils are balanced in a similar position in the magnetic field. The known correct coil is now removed and one to be tested applied. After application the switch arm 12 is now rotated in either direction to see if a lowered reading on the meter is obtained, if that is possible. Suppose, for example, that through motion of the switch arm 12 it is determined that that point on the 4000 scale dial indicated as +2 shows the lowest reading on the voltmeter. Then that indicates that the coil being tested has 4002 turns and therefore is two turns away from what it was intended to have originally. Thus, all that is necessary to be done to change from testing coils having one turn ratio to those having another is to replace the standard coil, move the switch 4 to that position indicated for the other turn range, and then adjust through the turn selector S–2 until a minimum balance is obtained. It will thus be seen that I have provided a very simple and rugged means for quickly testing coils to ascertain the exact number of turns thereon for specific apparatus.

I claim:

1. In testing means, a magnetizable core having a removable section upon which a coil to be tested may be mounted, flux generating means mounted on the core, a standard coil mounted on said removable section in juxtaposition to the coil to be tested, means simultaneously engaging opposite faces of the coils and completing electrical contact with the test coil, said engaging means being adjustable along the section for adjusting the two coils to balance the fields, and indicating means connected to the coils to indicate the combined induced voltages thereof.

2. In testing means, a magnetizable core having a removable section upon which a coil to be tested may be mounted, flux generating means mounted on the stationary part of the core, a standard coil mounted on said removable section in juxtaposition to the coil to be tested, adjustably positionable means engaging opposite sides of the two coils to clamp them together and determine the correct balanced position along the removable section to balance the fields, indicating means and conductive means connecting the indicating means to the coils in inverse relation so that the voltages generated in each coil by the flux will be in opposing relation and the indicating means will indicate the differences thereof.

3. In testing means, a closed magnetizable core having a movable section upon which a coil to be tested may be mounted, an adjustable flux generating means for exciting the core to provide various field strengths, a multiple section switching means for different ranges of testing, a plurality of standard coils a selected one of which is mounted in juxtaposition to the coil to be tested on the movable section of the core connectable to the switching means for its range, a second switching means connected to the various series of the first switching means to identify the particular range being used, and indicating means connected to the coils and to the last-named switching means to indicate the voltage induced therein.

4. In testing means, a magnetizable core having a movable section upon which a coil to be tested may be mounted, an adjustable flux generating means mounted on the core to provide various field strengths, a multiple section switching means for different ranges of testing, a plurality of standard coils a selected one of which is mounted in juxtaposition to the coil to be tested on the movable section of the core each standard coil being connectable to the switching means for its range, a second switching means connected to the various series of the first switching means to identify the particular range being used, indicating means, and conducting means inter-connecting the last-named switching means and the indicating means with the first switching means so that the test coil and the standard coil in use are connected in differential or bucking relation and the voltages induced in one tend to cancel the voltages induced in the other.

5. In means for testing the number of turns on a coil, a closed core for supporting a coil to be tested, means for generating flux mounted on said core, a standard coil having more turns thereon than it is presumed the coil to be tested has, mounted on said core in juxtaposition to the coil to be tested, taps on said standard coil both above and below the presumed turn number of the coil to be tested, switching means connected to said taps, adjustable means to simultaneously move the coils on the core to balance the fields in the two coils, indicating means and conductive means interconnecting the coils in differential relation to the switching means and to the indicating means to read the resultant voltage as the switching means is operated, the lowest resultant voltage indicating the number of turns in the coil being tested as that shown on the switching tap point.

6. In means for testing the number of turns in an induction coil, a closed magnetic circuit upon which a coil to be tested may be mounted, a plurality of standard coils each having additional turns above those of the coil to be tested alternately utilized a selected one being mounted adjacent the coil to be tested, means for balancing the magnetic field so that a standard coil and the coil being tested will be energized equally, taps on each standard coil both above and below the number presumed on the coil to be tested, switching means connected to the taps of each standard coil, and indicating means connected to both the test coil and to the standard coils and to the switching means so that the indicating means will indicate the relative output of the coils in circuit.

7. In testing means, a magnetizable core having a removable section upon which a coil to be tested is mounted, flux generating means for exciting the core, a standard coil mounted on said removable section in juxtaposition to the coil to be tested, a stop member slidable on said section engaging one of the coils, and means for moving the stop member longitudinally of the section to balance the coils in the magnetic field.

8. In testing means, a magnetizable core having a removable section upon which a coil to be tested is mounted, flux generating means for exciting the core, a standard coil mounted on said removable section in juxtaposition to the coil to be tested, a stop member slidable on said section engaging one of the coils, means for moving the stop member longitudinally of the section to balance the coils in the magnetic field, a block of insulating material slidable on said section and engaging the opposite face of the other coil, said coil having exposed contacts connected to the winding and a plurality of contacts mounted on said insulating block to engage the exposed contacts on the coil when assembled on said removable section.

9. In testing means, a magnetizable core having a movable section upon which a coil to be tested is mounted, an adjustable flux generating means mounted on the core to provide various field strengths, a plurality of tapped standard coils having different numbers of turns, a plurality of switching means connected to the taps on the standard coils, a selected one of said standard coils being mounted in juxtaposition to the coil to be tested on said movable section, a range selector switch connected to said standard coils to connect into circuit the one mounted on the core, indicating means and conductive means interconnecting said standard coils, test coil, switching and indicating means in differential relation to indicate minimum voltage as the first-named switching means is operated over the taps of the standard coil being energized by the setting of the range selector switch.

10. In testing means, a magnetizable core having a removable section upon which a core to be tested is mounted, said test coil having exposed contacts connected to said winding, flux generating means for exciting said core, a standard coil mounted on said removable section in juxtaposition to the coil to be tested, an adjustable stop member slidable on said removable core section engaging one of said coils to determine the axial position thereof and a second member of insulating material slidable on said core section and carrying spaced electrical contact members engageable with the exposed contacts on the test coil to clamp the two coils against the adjustable stop and complete a circuit thereto.

References Cited in the file of this patent

UNITED STATES PATENTS

| Number | Name | Date |
|---|---|---|
| 2,237,254 | Broekhyysen | Apr. 1, 1941 |
| 2,432,948 | Thompson | Dec. 16, 1947 |
| 2,504,731 | Rose | Apr. 18, 1950 |
| 2,540,398 | Lesniak | Feb. 6, 1951 |